Jan. 30, 1951

W. H. MYERS 2,539,458

DOUBLE-ACTING DIAL INDICATOR

Filed March 8, 1946

INVENTOR
WILLIAM H. MYERS

BY [signature]

ATTORNEY

Patented Jan. 30, 1951

2,539,458

UNITED STATES PATENT OFFICE 2,539,458

DOUBLE-ACTING DIAL INDICATOR

William H. Myers, Converse, Ind., assignor, by mesne assignments, to Farnsworth Research Corporation, a corporation of Indiana Application March 8, 1946, Serial No. 652,916

4 Claims. (Cl. 116—124.1)

This invention relates generally to tuning indicators for radio receivers and more particularly it relates to a tuning indicator adapted for use in comparatively small radio receivers.

It is conventional to provide in radio receivers a tuning indicator, the face of which bears a complete scale indicative of the entire tuning range of the receiver. In order that such an indicator may be easily visible to the operator of the receiver, it is necessary that it be comparatively large and occupy a considerable proportionate area of the front of a radio receiver. This is particularly true of table model receivers and automobile receivers. In fact, the indicator of a typical, comparatively small, radio receiver comprises substantially the entire front wall of the receiver. On the other hand, if the conventional tuning indicator is reduced in size, it becomes comparatively difficult to read as the scale divisions must be greatly reduced. This becomes undesirable in automobile receivers, since it is usually the driver who diverts his attention from the operation of the automobile and adjusts the tuning of his radio receiver.

Accordingly, it is the primary object of this invention to provide a tuning indicator of reduced size and with a tuning range scale of substantially conventional size whereby there is no decrease in legibility of the tuning scale.

In accordance with this invention, there is provided a tuning indicator for radio receivers comprising a scale for indicating the tuning range of the associated radio receiver. There is also provided a moveable pointer so associated with the scale that it may be moved to indicate on the scale the adjustment of the tuning condensers of the receiver. In order to reduce the degree of movement of the pointer, it is provided that the scale itself may be moved with respect to the pointer.

For a better understanding of the invention, together with other and further objects thereof, reference is made to the following description, taken in connection with the accompanying drawings and its scope will be pointed out in the appended claims.

Figure 1:
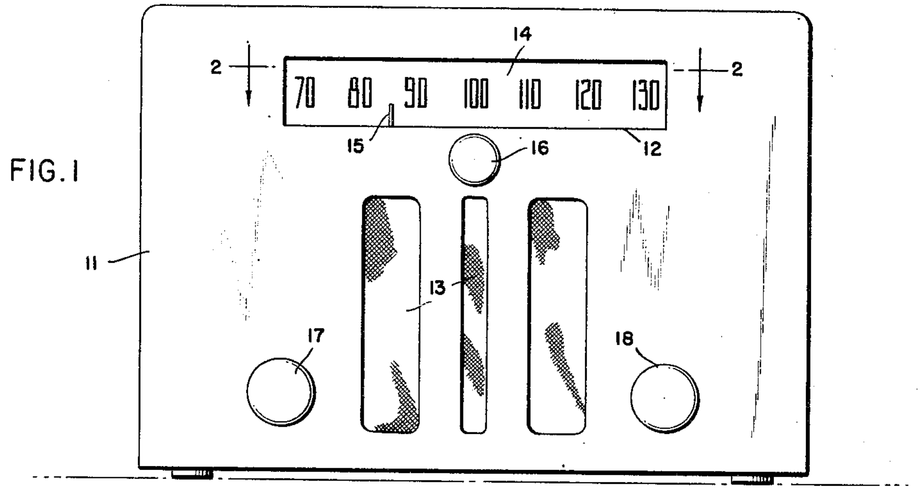
Fig. 1 is an elevation of a radio receiver illustrating the front portion thereof including the tuning indicator, the loud-speaker grill and the control knobs.

Referring to the drawings, there is provided in accordance with this invention, a radio receiver including a front panel member 11 wherein there is provided an aperture 12 for displaying a tuning indicator. There is also provided a loud-speaker grill 13 behind which may be mounted a loud-speaker for reproducing received signals. For indicating the tuning of the receiver there is provided a moveable scale member 14 which in its preferred embodiment comprises an endless flexible belt on which is imprinted or otherwise disposed a scale for showing the tuning range of the receiver. Associated with the scale member 14 is a moveable pointer 15 which is adapted to be moved with respect to the scale in a direction opposite to the direction of movement of the scale. Control knobs 16, 17 and 18 are provided for adjusting the tuning, volume level and tone control, respectively, of the receiver.

For supporting the tuning indicator mechanism, there is provided a frame member 19 (Fig. 3) which may be attached in any suitable fashion either to the chassis 20 of the radio receiver or to the front panel 11 thereof. For the sake of convenience in illustrating the invention, frame member 19 is illustrated in the drawings as being attached to the panel 11. To the lower extremity 21 of frame member 19, there is moveably attached a roller 24 by means of a suitable pin 22. At the opposite side of the receiver, there is provided a second and identical frame member 19 and roller 25 although the second member 19 is not illustrated in the drawings. For supporting the lower ends of the rollers 24 and 25, there are provided frame members 26 through one end of which project the lower ends of pins 22 and 23 (Fig. 3) for moveably supporting the lower ends of the rollers 24 and 25. The frame members 26 may be attached to the chassis 20 of the radio receiver by welding or rivets, for example.

In the preferred embodiment of this invention, the tuning indicator comprises the endless flexible member 14 which extends between and around the rollers 24 and 25 whereby the member 14 may be moved in such fashion that the scale indications pass across the aperture 12 in panel 11. As will be explained hereinafter, this makes possible a substantial reduction in the size of aperture 12 without any noticeable reduction in the size of the scale indications marked on the flexible member. As an alternative, the scale member 14 may comprise a rigid frontal section bearing the tuning scale and having connected thereto flexible control members for extending around the rollers 24 and 25.

Figure 2:
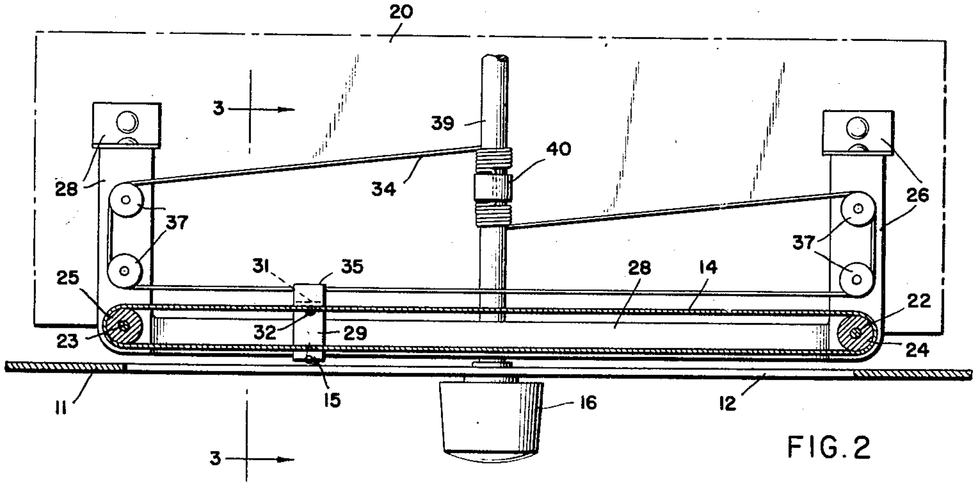
Fig. 2 is a cross section taken on line 2—2 of Fig. 1 and showing the tuning indicator together with its control mechanism.
Figure 3:
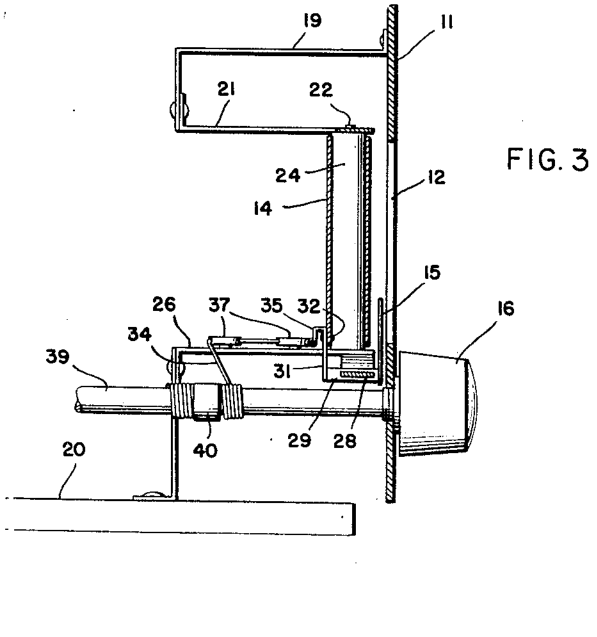
Fig. 3 is a cross section taken on line 3—3 of Fig. 2 and also showing the tuning indicator and its control mechanism.

The frame members 26 may be connected by a track or guide member 28, which is preferably rectangular in cross section as indicated in Fig. 3. There is provided in slidable relation with the track, a carriage 29 having the form indicated in Figs. 2 and 3 and being provided with a slot as illustrated in Fig. 3 whereby the carriage may be moved on track 28.

On the front portion of carriage 29, there is attached the pointer 15 which extends upwardly in front of the member 14 whereby the pointer is adapted to indicate, with respect to the scale, the adjustment of the tuning condensers of the radio receiver. On the rear of carriage 29 there is attached an upwardly extending member 31 to which may be fixed as at 32 the rear portion of the member 14 whereby, as the carriage moves, the member 14 may also be moved thereby. It is to be noted that by virtue of this arrangement, the frontal portion of member 14 is arranged to move in one direction while the pointer is arranged to move in the opposite direction. Thus, it is necessary that only a comparatively small portion of the member 14 be exposed to view from the front of the receiver.

For moving the carriage 29 there is provided a flexible connector 34 such, for example, as a cord which may be attached to an extension 35 of the member 31. There are provided a plurality of pulleys 37 on each of the frame members 26 and 28 for guiding the cord 34. For moving the carriage 29 it is provided that the shaft 39 which rotates the tuning condensers of the receiver may have the ends of cord 34 attached to collar 40 fixed to shaft 39, so that, as the shaft 39 is rotated, cord 34 may move the carriage 29 on the track 28.

When the tuning knob 16 is operated in a clockwise direction, for example, the shaft 39 puts tension on the right hand portion of cord 34 (Fig. 2) and simultaneously unreels the other end of cord 34 whereby the carriage 29 moves to the right. This movement of carriage 29 moves the rear portion of member 14 to the right and the front portion of member 14 to the left. Thus the scale divisions on member 14 are moved to the left and successively exposed through aperture 12. Simultaneously with the movement of member 14, the pointer 15 is moved to the right to provide an indication of the adjustment of the tuning condensers in the receiver. Since the dial and the pointer are both moved during a tuning adjustment, it is obvious that only a relatively small portion of the dial need be exposed to view.

When it is desired to tune a receiver to a broadcast program which is on a relatively lower frequency, the tuning knob 16 may be rotated in a counter-clockwise direction so that the carriage 29 moves to the left. Accordingly, the scale member 14 moves to the right across aperture 12 and pointer 15 moves to the left across aperture 12.

In its preferred embodiment, there is provided in accordance with this invention, a flexible endless scale member 14 but it will be readily understood that other forms of scale members may be utilized in accordance with the basic concept of this invention. For example, the scale member may comprise a linear non-flexible member which may be moved with respect to the aperture 12 in the front panel 11 of the receiver. In conjunction with such a scale member there may be provided a pointer adapted to be moved in a direction opposite to the movement of the scale member. In this embodiment of the invention, it would merely be necessary to provide a loop in the cord 34 to one side of which may be attached the scale member and to the other side of which may be attached the pointer. Since the opposite sides of the loop in the cord would move in opposite directions, opposite directions of movement would be imparted to the scale and pointer.

From the foregoing description it is apparent that there is provided in accordance with this invention a tuning indicator which is especially adapted for use in smaller radio receivers, such as those adapted for use in automobiles. While the apparent size of the tuning dial is substantially reduced, the scale on the tuning indicator is not reduced whereby there is no sacrifice as to legibility of the scale. Accordingly, an automobile operator is enabled to observe the tuning of the radio receiver without serious diversion of attention from his operational duties.

While there has been described what is at present considered the preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A tuning indicator for a radio receiver comprising a support, guide means mounted in said support, a movable scale member arranged on said guide means and comprising front and rear portions correlated so that upon movement of the scale the front portion is shifted in a direction opposite but to a degree equal to the rear portion, a movable indicator slidably mounted on said support for traversing the front portion of said scale member, means for connecting said movable indicator to the rear portion of said movable scale, a tuning shaft and driving means operatively connected between said shaft and the rear portion of said scale member to translate rotation of the tuning shaft into linear motion of one portion of said scale member for moving said scale member and said indicator in parallel planes relatively to one another.

2. A tuning indicator for a radio receiver comprising a frame, a pair of rollers spaced from one another in the same plane and supported in said frame, a flexible endless scale member extending around said rollers in frictional relationship therewith to form front and rear portions whereby a front portion of said scale member is presented for indicating the tuning of the radio receiver, a track member extending between said rollers and adjacent said scale member, a carriage operatively associated with said track for movement thereon, an indicating pointer supported on said carriage and extending in overlapping relation to the front portion of said scale member, means for connecting said carriage to the rear portion of said scale member, a tuning control shaft extending between said rollers and drive means connected between said shaft and said carriage for moving said carriage, said scale member and the pointer associated with said carriage.

3. A tuning indicator for a radio receiver comprising, a linearly shiftable scale member for indicating the tuning of the radio receiver, an index member located in cooperative relation to said scale member and being mounted for slidable movement in a direction parallel to the movement of said scale member, a tuning control mechanism, primary driving means connecting said tuning control mechanism and said index member, and secondary driving means connecting said index member and said scale member, said primary driving means operating to produce linear motion of said index member under the control of said tuning control mechanism and said secondary driving means operating to produce linear motion of said scale member to an equal degree but opposite in direction to the movement of said index member.

4. A tuning indicator for a radio receiver that comprises a support, a pair of spaced rollers mounted upon said support freely rotatable about parallel axes, a flexible endless belt on said rollers bearing a scale upon an exposed portion thereof, a track mounted on said support extending in a direction within a plane intersecting the axes of rotation of said rollers and being parallel to said belt, indicating means slidably mounted on said track cooperating with the scale on said belt, a linkage between said indicating means and a portion of said belt remote from the portion bearing the scale operative to effect linear sliding motion of said indicating means when said endless belt is moved but in a direction opposite to the movement of that portion of the belt bearing the scale, a tuning control shaft and motion translating means linking said shaft and said carriage whereby rotation of the shaft results in sliding motion of the carriage.

WILLIAM H. MYERS.

REFERENCES CITED

The following references are of record in the file of this patent:

UNITED STATES PATENTS

| Number | Name | Date |
|---|---|---|
| Re. 19,079 | Kollsman | Feb. 13, 1934 |
| Re. 21,419 | Kollsman | Apr. 9, 1940 |
| 1,655,891 | Nystrom | Apr. 10, 1928 |
| 1,809,509 | Crossley et al. | June 9, 1931 |
| 1,937,996 | Tichenor | Dec. 5, 1933 |
| 2,171,129 | Mahnken | Aug. 29, 1939 |